United States Patent [19]

Gotoda et al.

[11] Patent Number: 4,494,637
[45] Date of Patent: Jan. 22, 1985

[54] POWER TRANSMISSION SYSTEM FOR VEHICLES

[75] Inventors: Yusuke Gotoda, Tokyo; Toshimitsu Yoshimura, Tsurugashima, both of Japan

[73] Assignee: Honda Giken Kogyo Kabushiki Kaisha, Tokyo, Japan

[21] Appl. No.: 468,292

[22] Filed: Feb. 22, 1983

[30] Foreign Application Priority Data

Feb. 20, 1982 [JP] Japan .................. 57-26356

[51] Int. Cl.³ .................. F16D 41/06; F16D 47/04
[52] U.S. Cl. .................. 192/48.4; 192/48.6; 192/103 B; 192/104 C
[58] Field of Search .................. 192/48.4, 48.5, 48.6, 192/48.92, 103 B, 104 C

[56] References Cited

U.S. PATENT DOCUMENTS

| 2,212,731 | 8/1940 | Dunn | 192/48.6 |
| 2,632,541 | 3/1953 | Dunn | 192/48.6 |
| 3,935,749 | 2/1976 | Groves | 192/104 C |
| 4,185,723 | 1/1980 | Kelbel | 192/48.92 |
| 4,187,728 | 2/1980 | Mazzorana | 192/104 C |
| 4,425,989 | 1/1984 | Gotoda | 192/48.92 |

Primary Examiner—Rodney H. Bonck
Assistant Examiner—James J. Merek
Attorney, Agent, or Firm—Armstrong, Nikaido, Marmelstein & Kubovcik

[57] ABSTRACT

A power transmission system for vehicles comprising a driving member connected to a crankshaft of an engine and a driven member connected to a driving wheel, the driving and driven members being connected together via a one-way clutch, a friction clutch and a direct-coupling clutch, which are disposed parallel to one another. The one-way clutch is adapted to transmit power only from the driving member to the driven member. The friction clutch is adapted to frictionally connect the driving and driven members together when it receives a rotary torque at not more than a predetermined level whereas it is slipped when the rotary torque has exceeded a predetermined level. The direct-coupling clutch is normally maintained in a connected state but it is put in a disconnected state when the speed of revolution of the engine has exceeded a predetermined level.

7 Claims, 7 Drawing Figures

POWER TRANSMISSION SYSTEM FOR VEHICLES

BACKGROUND OF THE INVENTION

1. Field of the Invention

This invention relates to a power transmission system for vehicles, mainly for motorcycles.

2. Description of the Prior Art

When a power transmission system for vehicles receives an excessively large negative lead due to a sudden deceleration of the engine, it is generally vibrated. A power transmission system for vehicles, which is designed with a view to minimizing such vibrations by preventing an excessively large negative load from being transmitted to the engine, has already been proposed. In this power transmission system, a driving member connected to a crankshaft of the engine and a driven member connected to a driving wheel are joined together via a one-way clutch and a friction clutch, which are disposed parallel to each other, the one-way clutch being so formed that it is put in a connected state when a positive load is applied thereto and in a disconnected state when a negative load is applied thereto, the friction clutch being so formed that it is slided when a rotary torque at a level not lower than a predetermined level is applied thereto. According to this power transmission system, when a positive load is applied to the engine, the power of the engine can be transmitted without slip to the driving wheel via the one-way clutch. On the other hand, when a negative load is applied to the engine, the friction clutch is slided, so that transmission of a negative load at a level not lower than a predetermined level can be prevented. However, the above-described power transmission system has the following drawbacks. Namely, when an engine is so-called push-started, i.e. when a vehicle is moved by being pushed by the human power to apply the driving torque to the driving wheel and crank the engine with the driving torque of a starting motor interposed between the driven member and driving wheel, the driving torque is partially absorbed into the friction clutch. Thus, the driving torque cannot be transmitted to the engine efficiently. This would cause the starting capability of the engine to be lost.

SUMMARY OF THE INVENTION

The present invention has been proposed in view of the above-mentioned inconveniences. It is an object of the present invention to provide a compact, simply-constructed power transmission system for vehicles of the above-mentioned kind, wherein a driving wheel and an engine can be connected together directly with a direct-coupling clutch in an initial stage of an engine-starting operation, where the rotational speed of the engine has not yet reached a predetermined level, whereby the above-mentioned inconvenience can be eliminated, while the direct-coupling clutch can be disconnected automatically when the engine has been put in a completely-exploded state with the rotational speed thereof exceeding a predetermined level, whereby a one-way clutch and a friction clutch can function as expected without any troubles.

To this end, the present invention provides a power transmission system comprising a driving member connected to a crankshaft of an engine and a driven member connected to a driving wheel, the driving and driven members being joined together via a one-way clutch, a friction clutch, and a direct-coupling clutch, which are disposed parallel to one another, the one-way clutch being so formed that it is put in a connected state when a positive load is applied thereto, and in a disconnected state when a negative load is applied thereto, the friction clutch being so formed that it is slipped when it receives a rotary torque not lower than a predetermined rotary torque, the direct-coupling clutch being so formed that it is normally maintained in a connected state, and put in a disconnected state when the speed of revolution of the engine has exceeded a predetermined level.

The above and other objects as well as advantageous features of the invention will become apparent from the following description of preferred embodiments taken in conjunction with the accompanying drawings.

BRIEF DESCRIPTION OF THE DRAWINGS

FIGS. 2–4 show a first embodiment of the power transmission system, wherein:

FIG. 2 is a developed plan view;

FIG. 3 is an enlarged longitudinal sectional view of a principal portion; and

FIG. 4 is a sectional view taken along the line IV—IV in FIG. 3.

FIGS. 5–7 show a second embodiment of the power transmission system, wherein:

FIG. 5 is a longitudinal sectional view;

FIG. 6 is an enlarged sectional view of a direct-coupling clutch; and

FIG. 7 is an enlarged fragmentary sectional view of a one-way clutch.

DESCRIPTION OF THE PREFERRED EMBODIMENTS

The present invention will now be described with reference to its embodiments used as power transmission systems for motorcycles.

Figure 1:
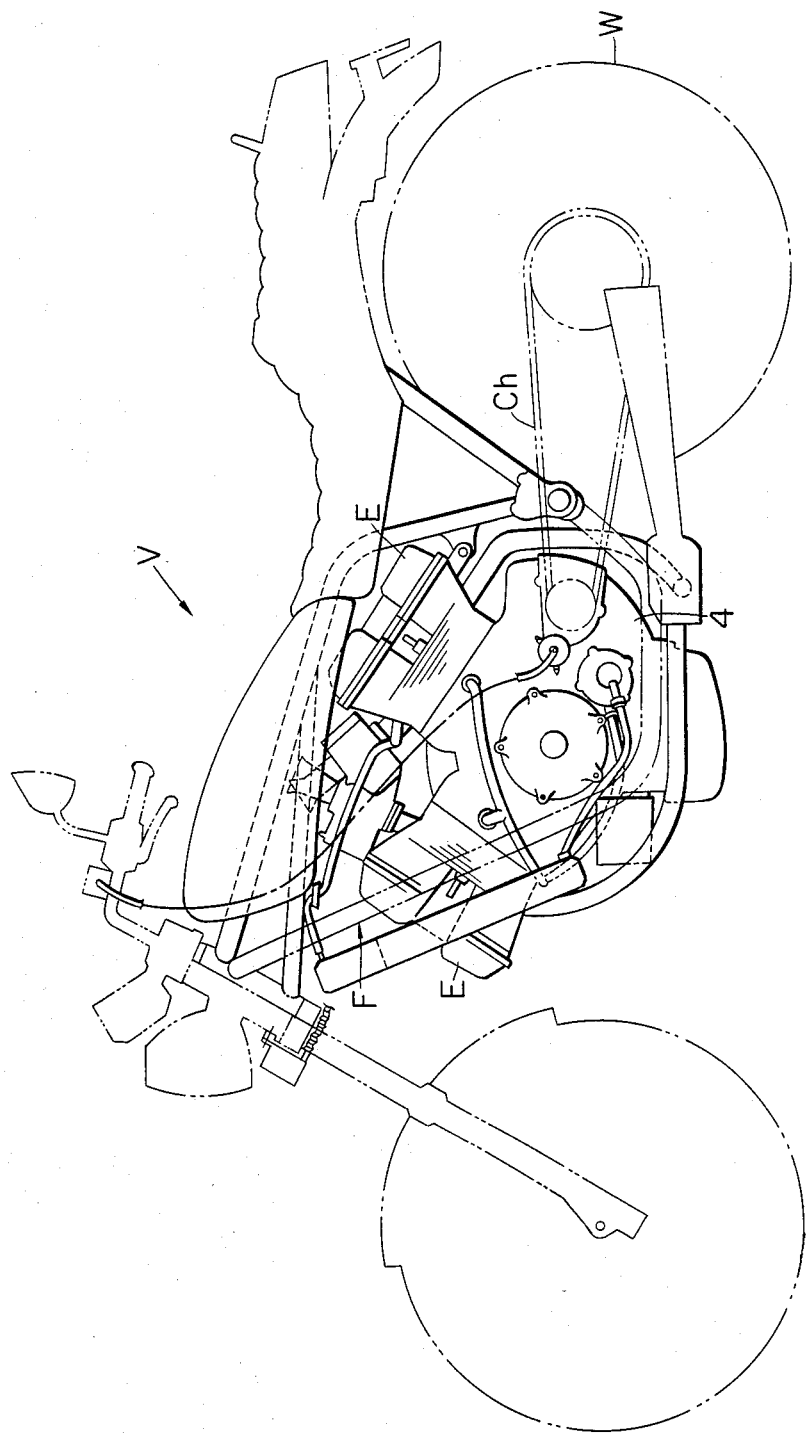
FIG. 1 is a side elevational view of a motorcycle, on which a power transmission system according to the present invention is mounted.
Figure 2:
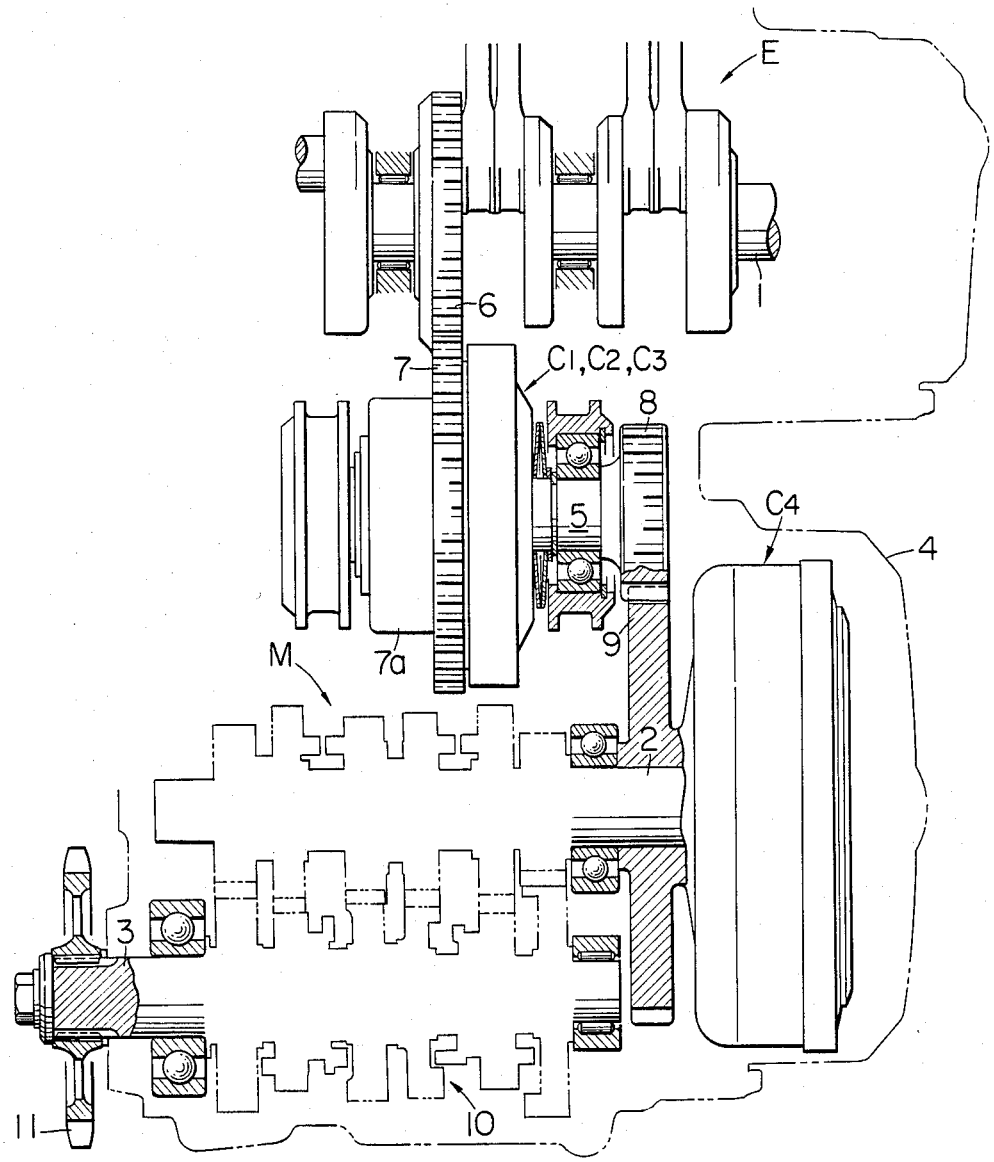
Figure 3:
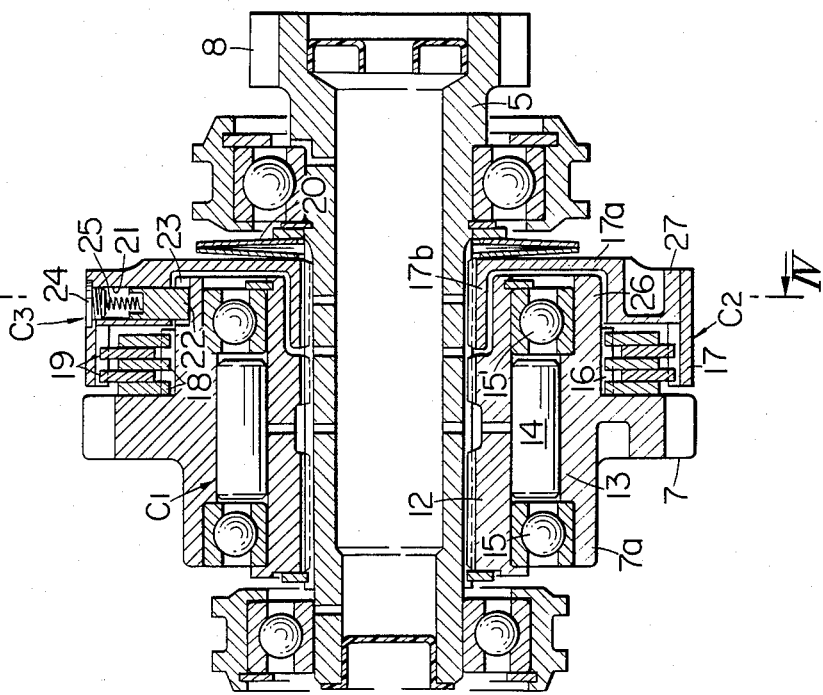
Figure 4:
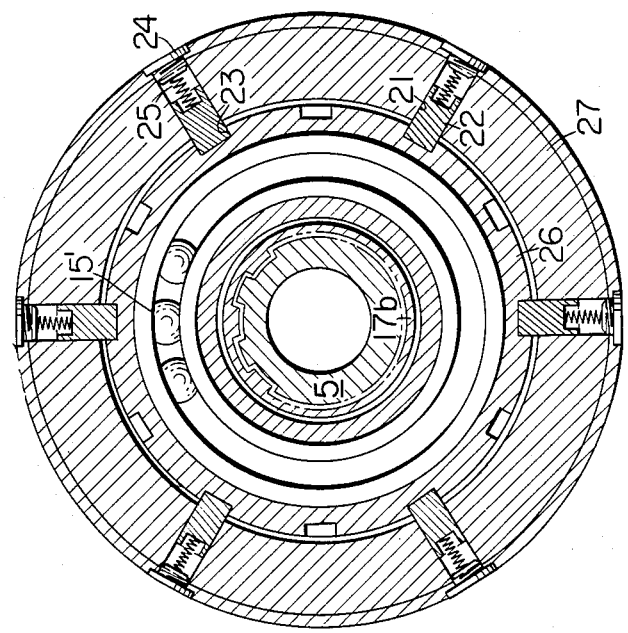

FIG. 1 shows a motorcycle V with a power transmission system according to the present invention mounted thereon. An engine E and a transmission casing 4, which casing serves also as a crank case, are mounted on a frame F of the motorcycle V. FIGS. 2–4 show a first embodiment of a power transmission system according to the present invention. Referring to FIG. 1, a crank-shaft 1 of the engine E and a transmission M having a main shaft 2 and a countershaft 3 are housed in the casing 4 in such a manner that the crankshaft 1, main shaft 2 and countershaft 3 are supported on the walls of the casing 4.

An intermediate shaft 5 is provided between and parallel to the crankshaft 1 and main shaft 2. A one-way clutch $C_1$, a friction clutch $C_2$ and a direct-coupling clutch $C_3$ are provided parallel to one another on the intermediate shaft 5. An input gear 7 used in common with these clutches $C_1$–$C_3$ is also mounted on the intermediate shaft 5. The input gear 7 is meshed with an output gear 6 formed on an outer circumferential surface of a crank web on the crankshaft 1.

A gear 8 is fixedly mounted on an output end of the intermediate shaft 5 and meshed with an input gear 9 for a known manual clutch $C_4$ mounted on an input end of the main shaft 2.

A known change gear mechanism 10 for operatively connecting the main shaft 2 and countershaft 3 together is provided therebetween. A sprocket 11 is fixedly mounted on an output end of the countershaft 3 and operatively connected as shown in FIG. 1, via a chain Ch to a driving wheel, i.e. a rear wheel W, of the motorcycle.

The construction of the one-way clutch $C_1$, friction clutch $C_2$ and direct-coupling clutch $C_3$ will be described in order with reference to FIG. 3.

First, the one-way clutch $C_1$ consists of a clutch inner 12 spline-fitted around the intermediate shaft 5, a clutch outer 13 formed on an inner circumferential surface of a boss 7a, by which the clutch inner 12 is surrounded, of the input gear 7, and a plurality of wedge rollers 14 provided between the clutch inner and outer 12, 13, the boss 7a being rotatably supported on the clutch inner 12 via bearings 15, 15'. When the one-way clutch $C_1$ receives a positive load during an operation of the engine E, the clutch inner and outer 12, 13 are connected together owing to the known wedging effect of the wedge rollers 14. When the one-way clutch $C_1$ receives a negative load with the engine E in operation, the wedge rollers 14 are turned idly to disengage the clutch inner and outer 12, 13 from each other.

The friction clutch $C_2$ includes a clutch inner 16 formed on an outer circumferential surface of the boss 7a of the input gear 7, a clutch outer 17 surrounding the clutch inner 16, a plurality of driving friction plates 18 ... slidably spline-fitted around an outer circumferential surface of the clutch inner 16, and a plurality of driven friction plates 19 ... superposed alternately on the driving friction plates 18 ... and fitted slidably around an inner circumferential surface of the clutch outer 17. A side wall 17a of the clutch outer 17 extends in opposition to a side surface of the input gear 7 with the friction plates 18, 19 interposed therebetween and receives at its rear surface the resilient force of a dish spring 20 to press these friction plates 18, 19. Therefore, the frictional connecting, i.e. the slip torque, of the friction plates 18, 19 is determined by a setting load on the dish spring 20. The clutch outer 17 has a boss 17b in the central portion of the side wall 17a thereof. The boss 17 is slidably spline-fitted around the intermediate shaft 5 so as not to prevent the side wall 17a from pressing the friction plate 18, 19.

The direct-coupling clutch $C_3$ consists of a clutch inner 26 formed on an outer circumferential surface of the boss 7a of the input gear 7 at a location near the clutch inner 16 in the friction clutch $C_2$, the clutch inner 26 having a plurality of locking recesses 23 ... on its outer circumferential surface, a clutch outer 27 projecting in the inner side of the side wall 17a of the clutch outer 17 of the friction clutch $C_2$ so as to surround the clutch inner 26 and having a plurality of pin bores 21 ... arranged at regular intervals in the circumferential direction thereof, lock pins 22 which are slidably fitted in the pin bores 21 in such a manner that the lock pins 22 can be moved out of and into the pin bores 21 at the side of an inner circumferential surface of the clutch outer 27, and which are adapted to engage, especially when they are in a projecting state, with the locking recesses 23, and coiled springs 25 each provided between the lock pin 22 and a cap 24 closing the pin bore 21. When the lock pins 22 are engaged with the locking recesses 23, the relative axial movement of the clutch inner and outer 26, 27 can be made but their relative rotating movement is prevented to place the direct-coupling clutch $C_3$ in a connected state. When the lock pins 22 are disengaged from the locking recesses 23, the relative rotating movement of the clutch inner and outer 26, 27 can be allowed to place the direct-coupling clutch $C_3$ in a disconnected state. Thus, the lock pins 22 are normally engaged with and held in the locking recesses 23 owing to the resilient force of the coiled springs 25 to keep the direct-coupling clutch $C_3$ in a connected state. When a rotational speed of the clutch inner 26, which is operatively connected to the crankshaft 1, is increased so that the centrifugal force applied to the lock pins 22 has become greater than the resilient force of the coiled springs 25, the lock pins 22 are disengaged from the locking recesses 23 to cause the direct-coupling clutch $C_3$ to be disconnected. The disconnection of the direct-coupling clutch $C_3$ coincides with the destruction of the balance between a setting load on the coiled springs 25 and the centrifugal force applied to the lock pins 22. Accordingly, when a setting load on the coiled springs 25 is suitably selected, the time for disconnecting the direct-coupling clutch $C_3$ with respect to a rotational speed of the engine E can be arbitrarily regulated. In order to excellently carry out a starting operation of the engine E, it is necessary that the direct-coupling clutch $C_3$ be maintained in a connected state at least during the cranking of the engine E. Therefore, a setting load on the coiled springs 25 in, for example, this embodiment is determined in such a manner that the direct-coupling clutch $C_3$ is disconnected at an instant at which the engine E has substantially reached an idling region.

The operation of this embodiment will now be described. While the engine E is stopped, or while the engine is rotated at a speed lower than an idling speed, for example, while the engine E is cranked, the centrifugal force is not applied to the lock pins 22, or such centrifugal force, if any, that is smaller than a setting load on the coiled springs 25 is applied thereto. Accordingly, the lock pins 22 are engaged with and held in the locking recesses 23 in the clutch inner 16 owing to the resilient force of the coiled springs 25, i.e. the direct-coupling clutch $C_3$ is maintained in a connected state. Consequently, when the engine E is so-called push-started, the driving torque applied to a rear wheel by pushing the vehicle with the human power can be distributed from the intermediate shaft 5, which is rotated in accordance with the rotation of the rear wheel, to the parallel-disposed friction clutch $C_2$ and direct-coupling clutch $C_3$ to be then transmitted to the input gear 7 until the engine has been put in a completely-exploded state to reach an idling region. During this period of time, the above-mentioned driving torque is applied as a negative load to the one-way clutch $C_1$, so that the one-way clutch $C_1$ is disconnected. Thus, even when the driving torque distributed from the rear wheel to the friction clutch $C_2$ has become higher than a predetermined slip torque, the whole of the excess torque is transmitted without slip to the input gear 7 via the direct-coupling clutch $C_3$, so that the friction clutch $C_2$ is not slipped. So, the driving torque applied to the rear wheel can be transmitted without being attenuated to the crankshaft 1 to start the engine E with great force.

When the engine E is put in a completely-exploded state with the crankshaft 1 being rotated at a speed not lower than an idling speed, the lock pins 22, which are rotated in accordance with the rotation of the crankshaft 1, come into the pin bores 21 in the clutch outer 27 by the centrifugal force against the resilient force of the coiled springs 25, so that the direct-coupling clutch $C_3$ is maintained in a disconnected state as previously mentioned. When a positive load is applied to the engine E in the above-described state, i.e. in a normal operational state, the output torque from the crankshaft 1 is transmitted from the output gear 6 to the input gear 7, from which the torque is distributed to the parallel-disposed one-way clutch $C_1$ and friction clutch $C_2$. Since the one-way clutch $C_1$ is put in a connected state as mentioned previously when a positive load is applied thereto, the rotary torque distributed thereto is transmitted without slip to the intermediate shaft 5. Accordingly, even when the rotary torque distributed to the friction clutch $C_2$ has become higher than a predetermined slip torque, the whole of the excess torque is transmitted from the one-way clutch $C_1$ to the intermediate shaft 5, so that the friction clutch $C_2$ is not slipped. The output torque from the crank shaft 1 is thus transmitted to the intermediate shaft 5 efficiently, and then to the driving sprocket 11 via predetermined power transmitting parts, i.e. gears 8, 9, manual clutch $C_4$ and transmission M to drive the rear wheel W via the chain Ch.

When a negative load is applied to the engine E in a normal operation, for example, when the vehicle is shifted from a high-speed operational state to a decelerated operational state, the driving torque applied from the road surface to the rear wheel is transmitted to the crank shaft 1 via the above-mentioned power transmitting parts in the reverse order. In this case, the one-way clutch $C_1$ is put in a disconnected state as mentioned previously, so that the driving torque from the rear wheel is transmitted from the intermediate shaft 5 to the input gear 7 via the friction clutch $C_2$ alone. When the driving torque has been increased to a level not lower than a predetermined slip torque at the friction clutch $C_2$, slip occurs between the driving friction plates 18 and driven friction plates 19 therein. Consequently, the negative load transmitted to the engine E can be reduced to not more than a predetermined level.

Figure 5:
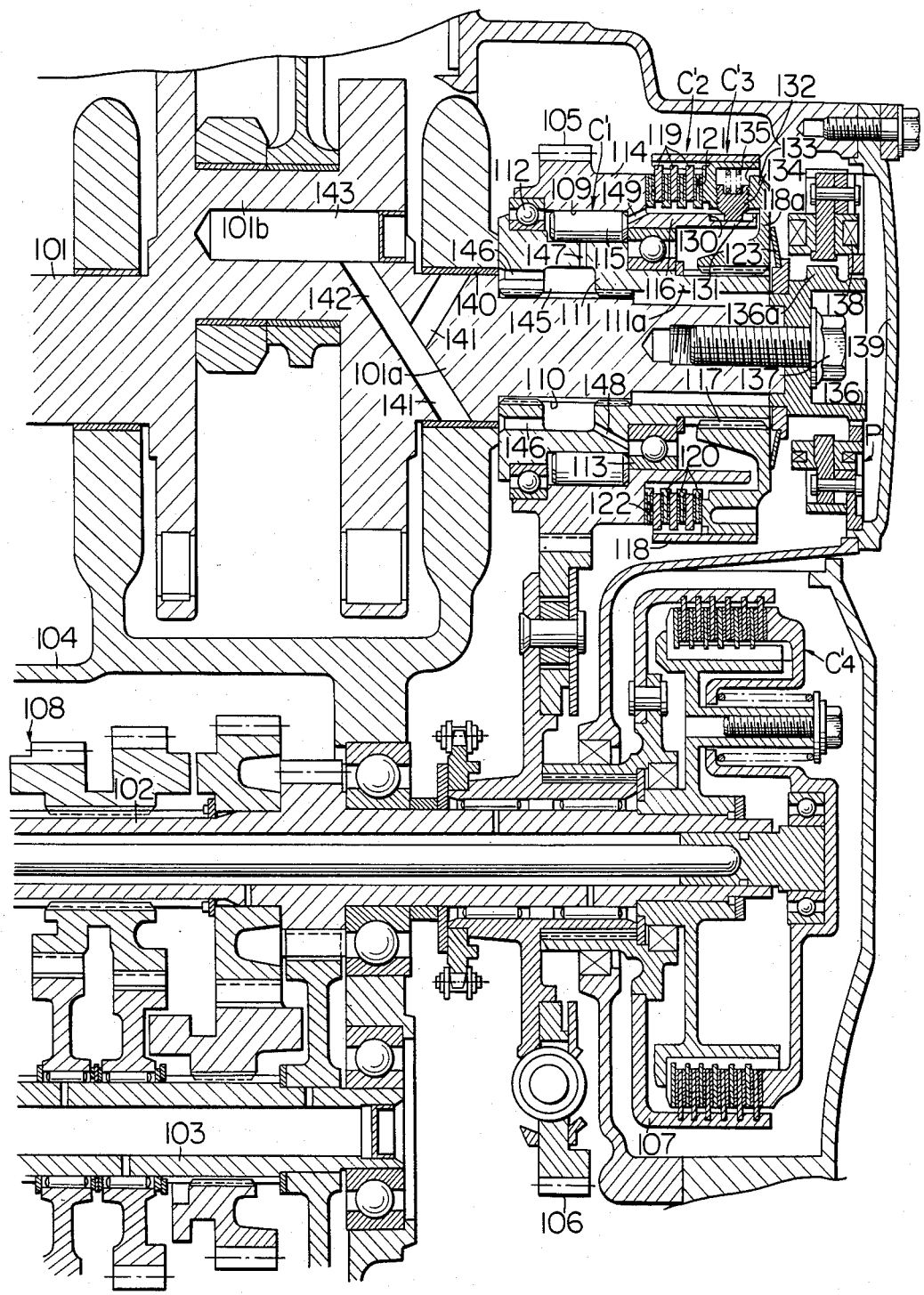
Figure 6:
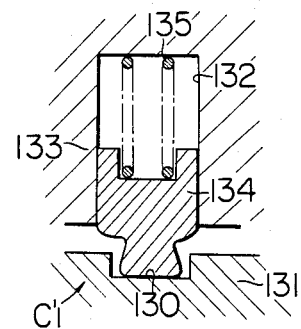
Figure 7:
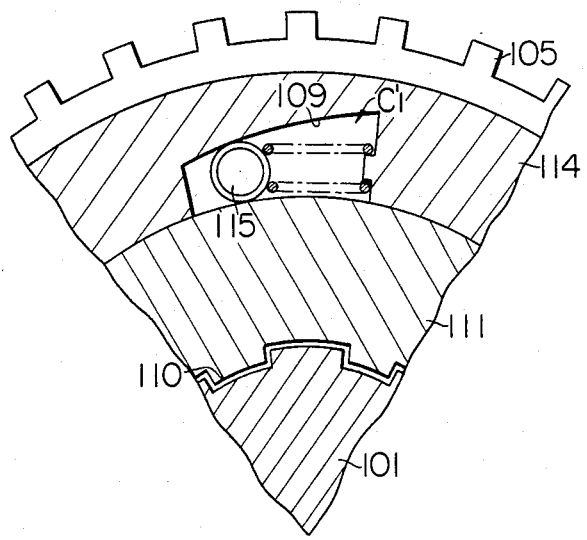

FIGS. 5–7 show a second embodiment of the present invention. In this embodiment, a driving gear 105 is mounted as shown in FIG. 5 on an output end portion, i.e. a right end portion of a crankshaft 101 supported on a transmission casing 104, which serves also as a crank case. A driven gear 106 meshed with the gear 105 and having a diameter greater than that of the latter is formed at an inner end portion, i.e. a left end portion of a clutch outer 107 of a manual clutch $C_4'$ mounted on a right end portion of the input shaft 102. Accordingly, the driven gear 106 is rotated at a lower speed than the driving gear 105.

A change gear mechanism 108 for operatively connected the input shaft 102 and an output shaft together at a plurality of change gear ratios is provided therebetween. A driving sprocket, which is operatively connected to a rear wheel of the motorcycle via a chain (not shown), is fixedly mounted on an output end portion, i.e. a left end portion of the output shaft 103. A one-way clutch $C_1'$, a friction clutch $C_2'$ and a direct-coupling clutch $C_3'$ are provided in parallel with one another between the crankshaft 101 and driving gear 105. The clutches $C_1'$, $C_2'$, $C_3'$ will be described in detail.

As shown in FIGS. 5 and 7, the one-way clutch $C_1'$ consists of a clutch inner 111 spline-fitted 110 fixedly around the crankshaft 101, a clutch outer 114 supported rotatably on an outer circumferential surface of the clutch inner 111 via right and left ball bearings 112, 113, and wedge rollers 115 inserted in wedge-shaped recesses 109 formed in the portions of the clutch outer 114 which are positioned between the bearings 112, 113. The driving gear 105 is formed integrally with and on an outer circumferential surface of a left end portion of the clutch outer 114. When the one-way clutch $C_1'$ receives a positive load during an engine operation, the clutch inner and outer 111, 114 come into engagement with each other owing to the wedging effect of the wedge rollers 115. When the one-way clutch $C_1'$ receives a negative load with the engine being in operation, the above-mentioned wedging effect of the rollers 115 is lost to disengage the clutch inner and outer 111, 114 from each other.

The friction clutch $C_2'$ includes a clutch inner 116 formed by axially extending a right end portion of the clutch outer 114 of the one-way clutch $C_1'$ so as to overhang the right bearing 113, a clutch outer 118 surrounding the clutch inner 116 and spline-fitted 117 slidably around the portion 111a of the clutch inner 111 of the one-way clutch $C_1'$ which extends rightward from the right bearing 113, a plurality of driving clutch plates 119 spline-fitted slidably in an inner circumferential surface of the clutch outer 118, and a plurality of driven clutch plates 120, which are arranged so as to be surprised on the driving clutch plates 119 alternately and which are spline-fitted slidably around an outer circumferential surface of the clutch inner 116. These clutch plates 119, 120 are provided between a pressure-applying surface 121 formed on an inner surface of a side wall 118a of the clutch outer 118 and a pressure-receiving surface 122 formed on an outer end surface of the clutch outer 114 of the one-way clutch $C_1'$. In order to apply a predetermined level of slip torque between the clutch plates 119, 120, a dish type clutch spring 123 is provided at the back of the clutch outer 118, the clutch spring 123 being adapted to urge the clutch outer 118 against the pressure-receiving surface 122.

The direct-coupling clutch $C_3'$ consists as shown in FIGS. 5 and 6 of a clutch inner 131 formed close to the clutch inner 116 of the friction clutch $C_2'$ and having a plurality of locking recesses 130 in its outer circumferential surface, a clutch outer 133 projecting to the inner side of the friction clutch $C_2'$ and having a plurality of pin bores 132 arranged at regular intervals in the circumferential direction thereof, lock pins 134 which are slidably fitted in the pin bores 132 in such a manner that the lock pins 134 can be moved out of and to the pin bores 132 at the side of an inner circumferential surface of the clutch outer 133, the locking pins 134 being engaged, especially when they are in a projecting state, with the locking recesses 130, and coiled springs 135 provided in the pin bores 132 for urging the lock pins 134 in the direction of the lock pins 134 projecting out from the inner circumferential surface of the clutch outer 133. When the lock pins 134 are engaged with the locking recesses 130, the relative axial movements of the clutch inner and outer 131, 133 can be made but the relative rotational movements thereof are prevented, so that the direct-coupling clutch $C_3'$ is put in a connected state. When the lock pins 134 are disengaged from the locking recesses 130, the relative rotational movements of the clutch inner and outer 131, 133 can be made and the direct-coupling clutch $C_3'$ is put in a disconnected state. Thus, the lock pins 134 are normally engaged with and held in the locking recesses 130 owing to the resilient force of the coiled springs 135 to put the direct-coupling clutch $C_3'$ in a connected state. When a rotational speed of the clutch inner 131, which is operatively connected to the crankshaft 101, is increased, so that the centrifugal force applied to the lock pins 134 has become greater than the resilient force of the coiled springs 135, the lock pins 134 are moved out of the locking recesses 130 to put the direct-coupling clutch $C_3'$ in a disconnected state.

A pulse rotor 136 of an ignition pulser P is fixed to a right end surface of the crankshaft 101 with a bolt 137, and the fixed end of the clutch spring 123 is supported on the pulse rotor 136. The pulse rotor 136 is provided with a signal projection 136a on an outer circumferential surface thereof. A pickup coil 138, which is adapted to generate an ignition pulse signal when the projection 136a passes the front side thereof, is provided on the inner wall of a side cover 139 detachably fastened to the casing 104 with screws.

Thus, in the casing 104, the one-way clutch $C_1'$, friction clutch $C_2'$, direct-coupling clutch $C_3'$ and ignition pulser P are disposed in the vicinity of the front side of the manual clutch $C_4'$ to make effective use of a dead space in front of the manual clutch $C_4'$.

The crankshaft 101 is supported rotatably at its journal portion 101a via a sleeve bearing 140 on the transmission casing 104 which also serves as a crank case. A plurality of oil passages 141 for supplying lubricating oil to an outer circumferential surface of the journal portion 101a are formed therein and communicated via a communication passage 142 with an axial oil passage 143 formed in a crank pin 101b. Accordingly, lubricating oil supplied from an oil pump (not shown) to the axial oil passage 143 is introduced to the outer circumferential surface of the journal portion 101a of the crankshaft 101 through the communication passage 142 and oil passages 141 to lubricate the mentioned surface.

An annular lubricating oil chamber 145 opened to an outer circumferential surface of the crankshaft 101 is formed in the clutch inner 111 of the one-way clutch $C_1'$, which is spline-connected to one end portion of the crankshaft 101. A plurality of axially-extending oil passages 146, which are formed in the clutch inner 111 with intervals between one another in the circumferential direction thereof, have their one ends opened into the lubricating oil chamber 145. The other end of each of the oil passages 146 is opened to a side surface of the journal portion 101a of the crankshaft 101. A lubricating oil supplied to the journal portion 101a flows into the oil chamber 145 through the oil passages 146 to be introduced therefrom to the wedge rollers 115 of the one-way clutch $C_1'$ via a plurality of oil passages 147 formed in the clutch inner 111, and also to the friction clutch $C_2'$ via a plurality of oil passages 149. The lubricating oil is then supplied to the direct-coupling clutch $C_3'$ through a plurality of oil passages 148 and a space between the clutch inner 111 of the one-way clutch $C_1'$ and clutch inners 116, 131 of the firction clutch $C_2'$ and direct-coupling clutch $C_3'$, respectively.

Since the operation and effect of this embodiment are substantially the same as those of the first embodiment, the descriptions thereof will be omitted.

In the embodiments described above, each of the input gear 7 and crankshaft 101 constitutes a driving member of the present invention, and each of the intermediate shaft 5 and driving gear 105 a driven member thereof.

As described above, the present invention is formed in such a manner that a driving member connected to a crankshaft of an engine and a driven member connected to a driving wheel are joined together via a one-way clutch, a friction clutch, and a direct-coupling clutch, which are disposed parallel to one another, the one-way clutch is so formed that it is put in a connected state when a positive load is applied thereto and in a disconnected state when a negative load is applied thereto, the friction clutch is so formed that it is slipped when it receives a rotary torque not lower than a predetermined rotary torque, and the direct-coupling clutch is so formed that it is normally maintained in a connected state while being placed in a disconnected state when the speed of revolution of the engine has exceeded a predetermined level. Therefore, when the engine is stopped, or when the rotational speed of the engine is not more than a predetermined level, the driven and driving members, i.e. the crankshaft of the engine and the driving wheel can be connected directly via the direct-coupling clutch. Accordingly, even when the engine is so-called push-started, or when the engine is started by a starting motor provided between the driven member and driving wheel, a sufficiently large starting torque can be transmitted without slip from the driving wheel or starting motor to the crankshaft. This allows the starting capability of the engine to be improved. Moreover, when an engine-starting operation has been completed and the rotational speed exceeds a predetermined level, the direct-coupling clutch is automatically disconnected. Accordingly, the one-way clutch and friction clutch can function as expected without any troubles. Namely, when a positive load is applied to the engine, the load can be transmitted without slip to the driving wheel via the one-way clutch. When a negative load is applied to the engine, that portion of the load which is in excess of a predetermined level is cut off its transmission by the slipping effect of the friction clutch so that the vibrations of the power transmission system, which are ascribable to an excessively large negative load on the engine, can be attenuated effectively.

The present invention is not, of course, limited to the above embodiments; it may be modified in various ways within the scope of the appended claims.

What is claimed is:

1. A power transmission system for vehicles, comprising a driving member connected to a crankshaft of an engine, and a driven member connected to a driving wheel, said driving and driven members being joined together via a one-way clutch, a friction clutch, and a direct-coupling clutch, which are disposed parallel to one another, said one-way clutch being so formed that it is put in a connected state when a positive load is applied thereto and in a disconnected state when a negative load is applied thereto, said friction clutch being so formed that it is slipped when it receives the rotary torque not lower than a predetermined rotary torque, said direct-coupling clutch being so formed that it is normally maintained in a connected state while being placed in a disconnected state when the speed of revolution of said engine has exceeded a predetermined level.

2. A power transmission system for vehicles according to claim 1, wherein said one-way clutch comprises a driving clutch member connected to said driving member, a driven clutch member connected to said driven member, and wedge rollers provided between said driven and driving clutch members and adapted to transmit power only from said driving clutch member to said driven clutch member.

3. A power transmission system for vehicles according to claim 1, wherein said friction clutch comprises a clutch inner connected to said driving member and having a plurality of driving friction plates, a clutch outer connected to said driven member so as to surround said clutch inner and having a plurality of driven friction plates superposed on said driving friction plates alternately, and a clutch spring for urging said clutch inner and outer toward each other to frictionally engage said driven and driving friction plates with one another with said predetermined level of force.

4. A power transmission system for vehicles according to claim 1, wherein said one-way clutch comprises a first clutch inner connected to one of said driving and driven members, a first clutch outer connected to the other of said driving and driven members and pivotably supported on said first clutch inner in the manner to surround the latter, and a plurality of wedge rollers provided between said first clutch inner and said first clutch outer and adapted to transmit power only from said driving member to said driven member; said friction clutch comprises a second clutch inner integrally formed with said first clutch outer and having a plurality of first friction plates, a second clutch outer connected to said first clutch inner or one of said driving and driven members so as to surround said second clutch inner and having a plurality of second friction plates superposed on said first friction plates alternately, and a clutch spring adapted to urge said second clutch inner and said second clutch outer toward each other and thereby bring said first and second friction plates into frictional engagement with one another with a predetermined level of force; and said direct-coupling clutch comprises a third clutch inner formed integrally with said second clutch inner of said friction clutch and having a plurality of circumferentially spaced locking recesses, a third clutch outer formed integrally with said second clutch outer of said friction clutch and having a plurality of circumferentially spaced pin bores opposed to said locking recesses, a plurality of lock pins slidingly engageable with said pin bores in said third clutch outer, and means for urging said lock pins in a direction in which said lock pins come into engagement with said locking recesses in said third clutch inner.

5. A power transmission system for vehicles according to claim 1, wherein said direct-coupling clutch consists of a centrifugal clutch.

6. A power transmission system for vehicles according to claim 5, wherein said centrifugal clutch comprises a clutch inner connected to one of said driving and driven members and having a plurality of circumferentially spaced locking recesses, a clutch outer connected to the other of said driving and driven members and surrounding said clutch inner, which clutch outer has a plurality of pin bores spaced in the circumferential direction thereof to be opposed to said locking recesses, a plurality of lock pins slidably engaged with said pin bores in said clutch outer, and means for urging said lock pins in a direction in which said lock pins are slided into engagement with said locking recesses in said clutch inner, said lock pins coming into engagement with said locking recesses with the force of said urging means to connect said clutch outer and inner together when the speed of revolution of said driving and driven members is not more than said predetermined level while said lock pins being disengaged from said locking recesses to disconnect said clutch outer and inner from each other against the force of said urging means when the speed of revolution of said driving and driven members has exceeded said predetermined level.

7. A power transmission system for vehicles according to claim 6, wherein said urging means is a spring.

* * * * *